(12) United States Patent
Wu

(10) Patent No.: US 9,459,449 B2
(45) Date of Patent: Oct. 4, 2016

(54) MEMS-BASED RAPIDSCAN DEVICE AND PROJECTOR HAVING SAME

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 97 days.

(21) Appl. No.: 14/305,116

(22) Filed: Jun. 16, 2014

(65) Prior Publication Data

US 2014/0368897 A1  Dec. 18, 2014

(30) Foreign Application Priority Data

Jun. 17, 2013  (TW) .............................. 102121302 A

(51) Int. Cl.
  *G02B 26/12* (2006.01)
  *G02B 26/10* (2006.01)
  *G02B 26/08* (2006.01)

(52) U.S. Cl.
  CPC .......... *G02B 26/101* (2013.01); *G02B 26/0833* (2013.01); *G02B 26/105* (2013.01)

(58) Field of Classification Search
  CPC ............ G02B 26/101; G02B 26/0833; G02B 26/105
  USPC ......... 359/198.1, 199.1, 202.1, 212.1–215.1, 359/221.2, 223.1–226.2
  See application file for complete search history.

(56) References Cited

U.S. PATENT DOCUMENTS

| | | | |
|---|---|---|---|
| 6,912,078 B2 * | 6/2005 | Kudrle | B81B 3/0062 359/224.1 |
| 7,283,112 B2 * | 10/2007 | Starkweather | G02B 26/0841 345/108 |
| 2005/0253055 A1 * | 11/2005 | Sprague | G02B 26/085 250/234 |
| 2009/0021884 A1 * | 1/2009 | Nakamura | B81B 3/0059 361/233 |

* cited by examiner

*Primary Examiner* — Stephone B Allen
*Assistant Examiner* — Rahman Abdur
(74) *Attorney, Agent, or Firm* — Zhigang Ma

(57) ABSTRACT

A device projecting images by micro electro-mechanical system (MEMS) technology mirrors includes a base, a rotating seat, a substrate, a reflective mirror, a driver, and a controller. The rotating seat is rotably positioned on the base. The substrate is positioned on the rotating seat. The at least one MEMS reflective mirror is formed on the substrate and configured for rotating in two directions under control of the attached driver and controller to form two-dimensional images in a range.

16 Claims, 4 Drawing Sheets

MEMS-BASED RAPIDSCAN DEVICE AND PROJECTOR HAVING SAME

FIELD

The present disclosure relates to projectors and particularly to a projector having a micro electro-mechanical systems (MEMS) rapidscan device.

BACKGROUND

Projectors may use a MEMS-based rapidscan device that has reflective mirrors. The reflective mirrors can be controlled to reflect light beam in two directions, such as horizontally and vertically. As such, the light beams form images on the screen.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the drawings.

Figure 1:
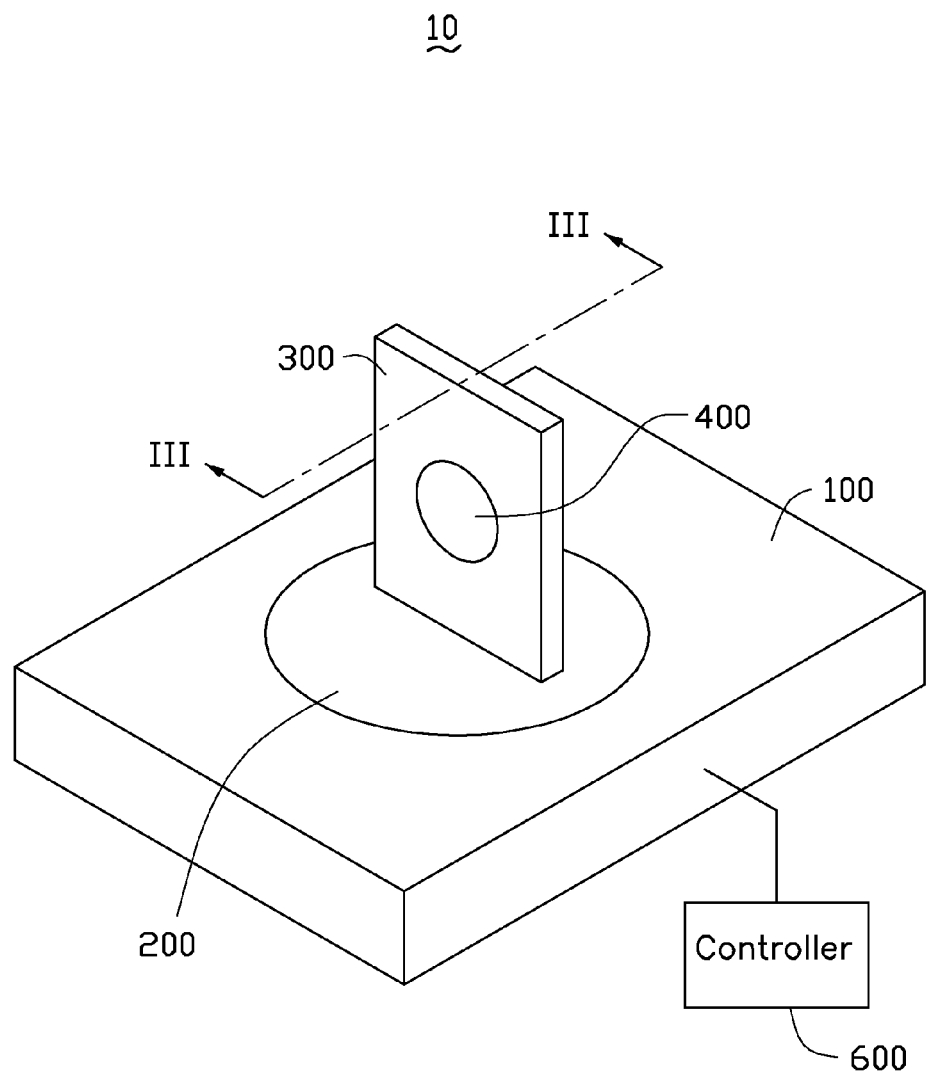
FIG. 1 is an isometric view of a rapidscan device according to an embodiment.
Figure 2:
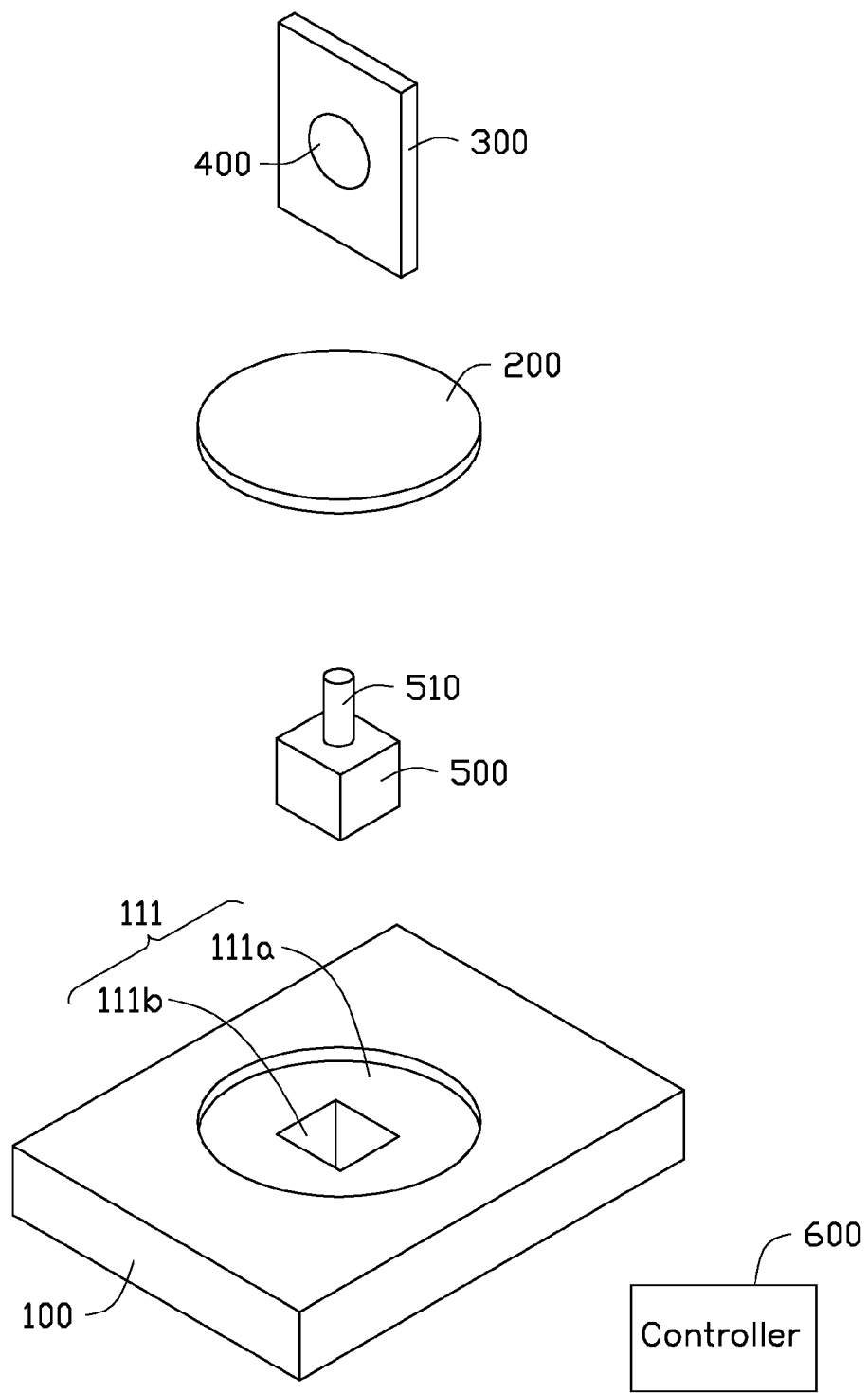
FIG. 2 is an exploded view of the rapidscan device of FIG. 1.
Figure 3:
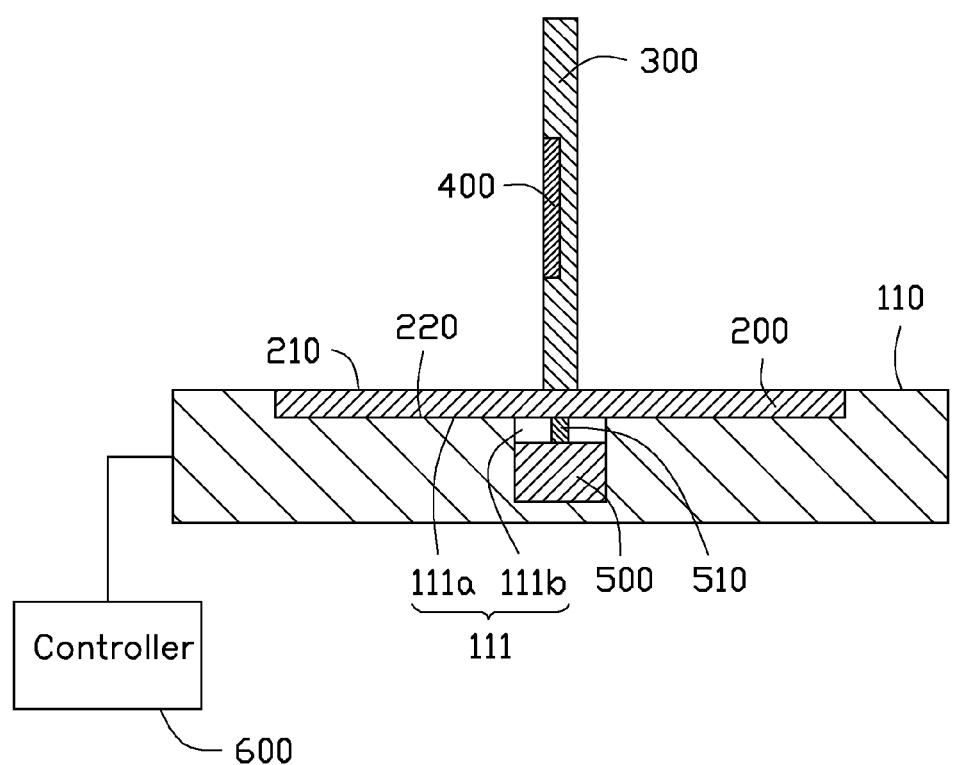
FIG. 3 is a cross-sectional view of the rapidscan device of FIG. 1 along line III-III.

FIGS. 1-3 show a rapidscan device 10 according to an embodiment. The rapidscan device 10 includes a base 100, a rotating seat 200, a substrate 300, a reflective mirror 400, a driver 500, and a controller 600.

As illustrated in FIG. 2, the base 100 includes a first surface 110, such as an upper surface, and defines a receiving groove 111 in the first surface 110. The receiving groove 111 includes a first section 111a, which may be circular, and a second section 111b which may be rectangular. The first section 111a is defined in the first surface 110 and the second section 111b is defined in a bottom surface of the first section 111a. An opening of the first section 111a in the first surface 110 is larger than an opening of the second section 111b in the bottom surface of the first section 111a.

The rotating seat 200 is substantially a circular disk and is substantially identical with the first section 111a in shape and size. That is, a diameter and a thickness of the rotating seat 200 are substantially equal to, or slightly smaller than, the respective diameter and depth of the first section 111a. The rotating seat 200 includes a second surface 210, such as a top surface, and a third surface 220, such as a bottom surface, opposite to the second surface 210 (see FIG. 3).

The substrate 300 and the reflective mirror 400 are constructed with micro electro-mechanical systems (MEMS) technology. That is, the substrate 300 can be made of silicon, polymers, metals, or ceramics. Various semiconductor technologies, such as deposition, patterning, photolithography, and etching may be employed on the substrate 300 to form the reflective mirror 400 in the substrate 300. The reflective mirror 400, when activated, can rotate relative to the substrate 300 in two orthogonal directions. As such, light reflected by the reflective mirror 400 can be output in two directions, such as vertically and horizontally, to form a two-dimensional image. That is, the reflective mirror 400 can project an image by rapid movement. In this embodiment, the substrate 300 is rectangular and the reflective mirror 400 is circular.

The driver 500 can be a rotating motor and includes a rotor shaft 510. The driver 500 is substantially identical with the second section 111b in shape and size. That is, a cross-section of the driver 500 except for the rotor shaft 510 is equal to or slightly smaller than a cross-section of the second section. A height of the driver 500 is substantially equal to or slightly larger than a depth of the second section 111b. The driver 500 includes a rotor shaft 510 which, when activated, can drive the rotor shaft 510 to rotate.

In assembly, the rotor shaft 510 is connected to a central portion of the third surface 220, and the driver 500 is in communication with the controller 600. Then, the driver 500 and the rotating seat 200 are placed into the receiving groove 111 such that the driver 500 fits and is received in the second section 111b and the rotating seat 200 is rotably received in the first section 111a. The rotor shaft 510 can slightly protrude out of the first section 111a. The second surface 210 is substantially coplanar with the first surface 210. As such, the rotating seat 200 is rotably received in the receiving groove 111.

The substrate 300 is positioned on the second surface 210. A radial line passing down from a center of the reflective mirror 400 and through a center of the rotating seat 200 is substantially perpendicular to the second surface 210.

Figure 4:
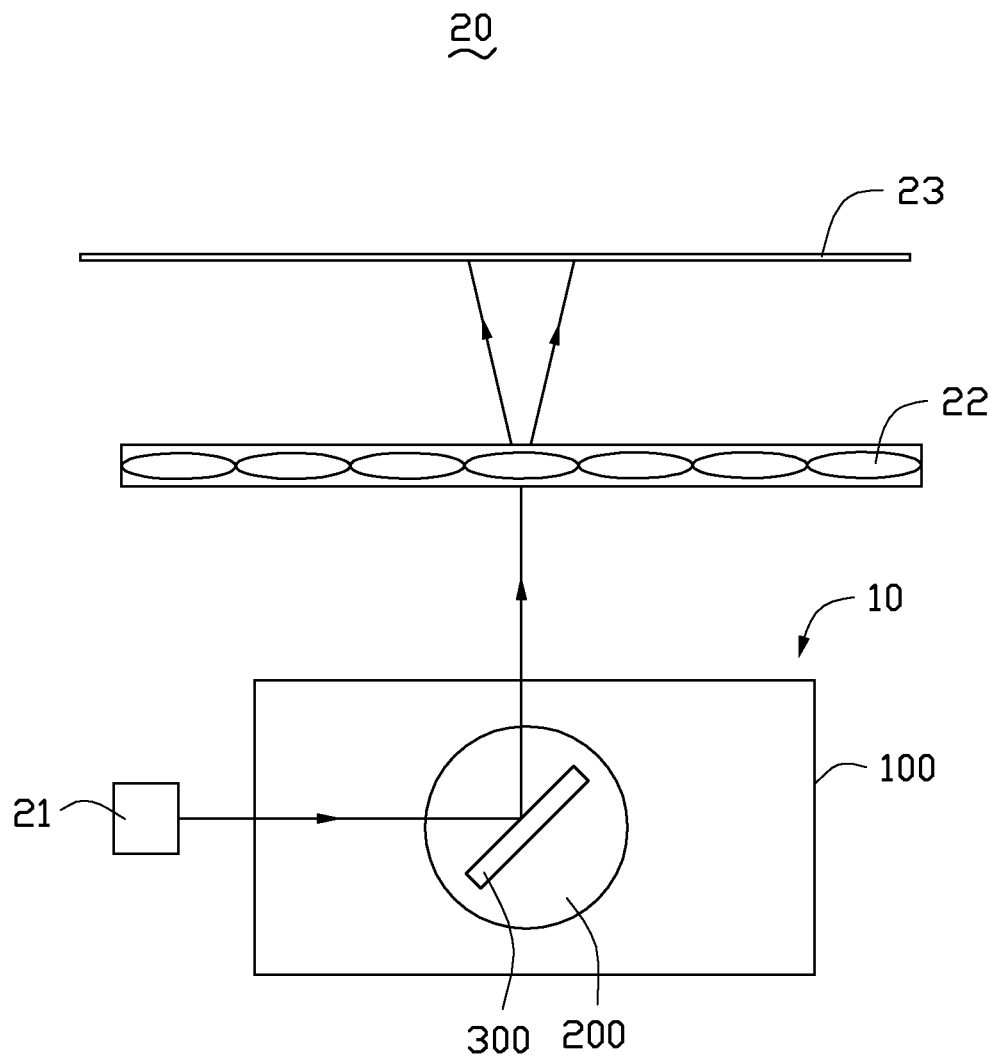
FIG. 4 is a planar view of a projector according to another embodiment.

FIG. 4 shows a projector 20 according to another embodiment. The projector 20 includes the rapidscan device 10, a light source 21, an array of projection lenses 22, and a screen 23.

The light source 21 can be a laser source and can emit a laser beam. The rapidscan device 10, the array of projection lenses 22, and the screen 23 are positioned along a light path of the laser beam.

In operation, the controller 600 controls the driver 500 to rotate the rotating seat 200 until the laser beam can be gathered and reflected by the reflective mirror 400 onto an appropriate range of the screen 23, through one of the projection lenses 22, to form images. Then, the driver 500 suspends motion for a stable projection, that is, until positional adjustment of the images on the screen 23 has been carried out. In this case, the controller 600 controls the driver 500 to drive the rotating seat 200 to adjust the range of the images on the screen 23.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A rapidscan device comprising:
   a base;
   a rotating seat rotably positioned on the base;
   a substrate positioned on the rotating seat;
   a reflective mirror formed on the substrate by a micro electro-mechanical system (MEMS) technology and configured for receiving a light beam and rotating in two directions under control of the MEMS for reflecting the light beam to scan in two directions to form images in a range;
   a driver coupled with the rotating seat, the driver being a rotating motor and comprising a rotor shaft directly connected to a central portion of the rotating seat; and
   a controller in communication with the driver and configured to control the driver to drive the rotating seat to rotate, thus adjusting the range of the images;
   wherein the base comprises a first surface and defines a receiving groove in the first surface, the driver and the rotating seat are received in the receiving groove, the rotating seat comprises a second surface and a third surface opposite to the second surface, the substrate is positioned on the second surface, and the rotor shaft is directly connected to a central portion of the third surface.

2. The rapidscan device of claim 1, wherein the rotating seat is substantially a circular disk, the driver is substantially a rectangular rotating motor, the receiving groove comprises a circular first section defined in the first surface and a rectangular second section defined a bottom surface of the first section, the rotating seat is received in the first section and the driver is received in the second section.

3. The rapidscan device of claim 2, wherein an opening of the first section in the first surface is larger than an opening of the second section in the bottom surface of the first section.

4. The rapidscan device of claim 2, wherein the rotating seat is substantially identical with the first section in shape and size, and the driver is substantially identical with the second section in shape and size.

5. The rapidscan device of claim 1, wherein the substrate is made of a material selected from the group consisting of silicon, polymers, metals, and ceramics.

6. The rapidscan device of claim 1, wherein a radial line passing down from a center of the reflective mirror and through a center of the rotating seat is substantially perpendicular to the second surface.

7. The rapidscan device of claim 6, wherein the first surface is coplanar with the second surface.

8. The rapidscan device of claim 6, wherein a rotation axis of the rotor shaft is perpendicular to the third surface.

9. The rapidscan device of claim 6, wherein the substrate is rectangular and the reflective mirror is circular.

10. A projector, comprising:
    a light source for emitting a light beam;
    a rapidscan device;
    an array of projection lenses; and
    a screen arranged along a light path of the light beam;
    wherein the rapidscan device comprises:
      a base;
      a rotating seat rotably positioned on the base;
      a substrate positioned on the rotating seat;
      a reflective mirror formed on the substrate by a micro electro-mechanical system (MEMS) technology and configured for receiving the light beam and rotating in two directions under control of the MEMS for reflecting the light beam to scan in two directions to form images in a range;
      a driver coupled with the rotating seat, the driver being a rotating motor and comprising a rotor shaft directly connected to a central portion of the rotating seat; and
      a controller in communication with the driver and configured to control the driver to drive the rotating seat to rotate, thus adjusting the range of the images;
      wherein the base comprises a first surface and defines a receiving groove in the first surface, the driver and the rotating seat are received in the receiving groove, the rotating seat comprises a second surface and a third surface opposite to the second surface, the substrate is positioned on the second surface, and the rotor shaft is directly connected to a central portion of the third surface.

11. The projector of claim 10, wherein a radial line passing down from a center of the reflective mirror and through a center of the rotating seat is substantially perpendicular to the second surface.

12. The projector of claim 10, wherein the first surface is coplanar with the second surface.

13. The projector of claim 10, wherein a rotation axis of the rotor shaft is perpendicular to the third surface.

14. The projector of claim 10, wherein the substrate is rectangular and the reflective mirror is circular.

15. A rapidscan device comprising:
    a base;
    a rotating seat rotably coupled to the base;
    a substrate coupled to the rotating seat;
    a reflective mirror formed on the substrate and being a micro electro-mechanical system, the reflective mirror configured to rotate in at least two directions;
    a driver coupled to the rotating seat and configured to rotate the rotating seat, the driver being a rotating motor and comprising a rotor shaft directly connected to a central portion of the rotating seat; and
    a controller electronically coupled to the driver and configured to transmit data to the driver to rotate the rotating seat, thereby adapting a range of the image formed in response to the rotation of the mirror;
    wherein the base comprises a first surface and defines a receiving groove in the first surface, the driver and the rotating seat are received in the receiving groove, the rotating seat comprises a second surface and a third surface opposite to the second surface, the substrate is positioned on the second surface, and the rotor shaft is directly connected to a central portion of the third surface.

16. The rapidscan device of claim 15, wherein a radial line passing down from a center of the reflective mirror and through a center of the rotating seat is substantially perpendicular to the second surface.

* * * * *